Figure 1:
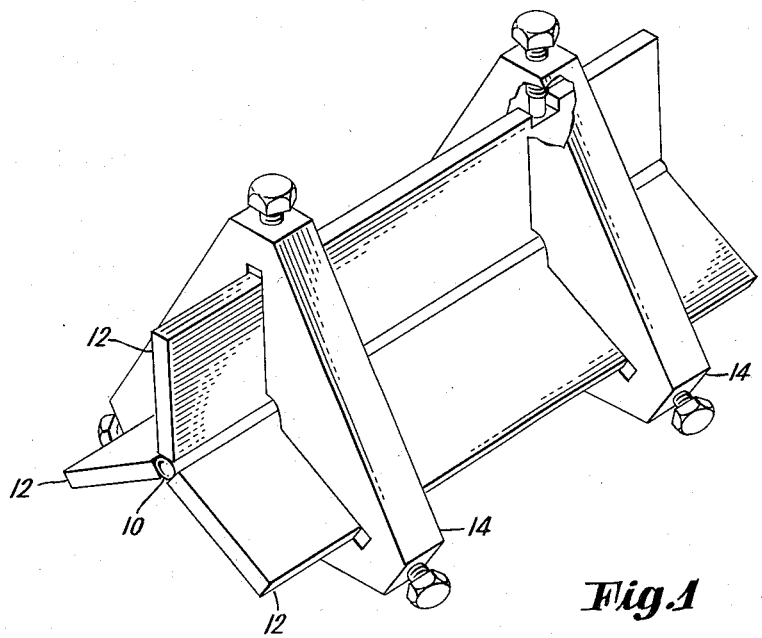

July 5, 1960  F. W. HARJES  2,943,382
METHOD FOR PRODUCING TRAVELLING WAVE TUBES
Filed Oct. 23, 1956  2 Sheets-Sheet 1

INVENTOR
FREDERICK WILLIAM HARJES
BY
ATTORNEY

July 5, 1960 F. W. HARJES 2,943,382
METHOD FOR PRODUCING TRAVELLING WAVE TUBES
Filed Oct. 23, 1956 2 Sheets-Sheet 2

INVENTOR
FREDERICK WILLIAM HARJES
BY Theodore C Jayh
ATTORNEY

United States Patent Office 2,943,382
Patented July 5, 1960

2,943,382

METHOD FOR PRODUCING TRAVELLING WAVE TUBES

Frederick William Harjes, Westbury, N.Y., assignor, by mesne assignments, to Sylvania Electric Products Inc., Wilmington, Del., a corporation of Delaware Filed Oct. 23, 1956, Ser. No. 617,744

3 Claims. (Cl. 29—25.13)

My invention relates to methods for assembling travelling wave tubes.

A conventional travelling wave tube structure comprises a cylindrical metal or glass envelope in which is inserted a conductor formed in the shape of a cylindrical helix; the helix and the envelope being uniformly spaced apart by means of spacer rods which extend between the helix and the envelope in a direction parallel to the axis of the helix and envelope. The spacer rods are preferably equidistantly spaced with respect to each other.

I have devised a new method for assembling the helix within the tube envelope.

Accordingly it is an object of the present invention to improve methods for assembling a helix within a tube envelope of a travelling wave tube.

Another object is to provide a new and improved method for assembling a helix within a tube envelope of a travelling wave tube.

Still another object is to assemble a helix within a travelling wave tube envelope by temporarily deforming either the helix or the envelope within its elastic limit, then inserting the helix within the envelope and restoring the deformed helix or envelope to its original shape to form an integral helix-envelope assembly.

These and other objects of my invention will either be explained or will become apparent hereinafter.

In accordance with the principles of my invention, I provide a method for mounting a first member (which is a conductor wound into a cylindrical helix) within a second member (which is a hollow cylindrical tube envelope open at both ends). One of the members is temporarily deformed circumferentially. A plurality of parallel spacer rods are then secured to the outer surface of the first member at spaced apart locations, each rod extending in a direction parallel to the axis of the first member.

The first member is then inserted within the second member. Finally, the deformed member is restored to approximately its original shape whereby an integral helix-envelope structure is formed, the helix and envelope being uniformly spaced apart circumferentially from each other by the spacer rods.

When a metal tube envelope is used, either the helix or the envelope can be deformed in the manner indicated. However, when a glass envelope is used, only the helix can be deformed; the tube envelope must remain rigid.

Figure 2A:
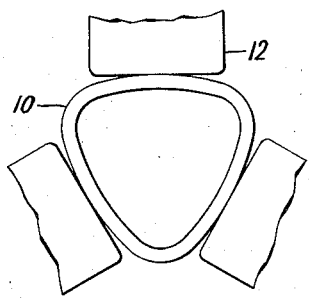
Figure 2B:
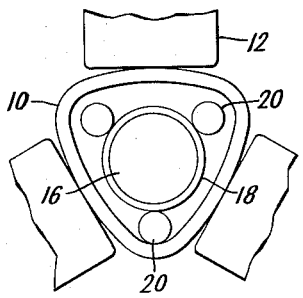
Figure 2C:
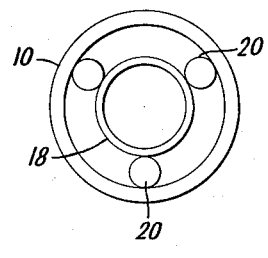
Figure 3:
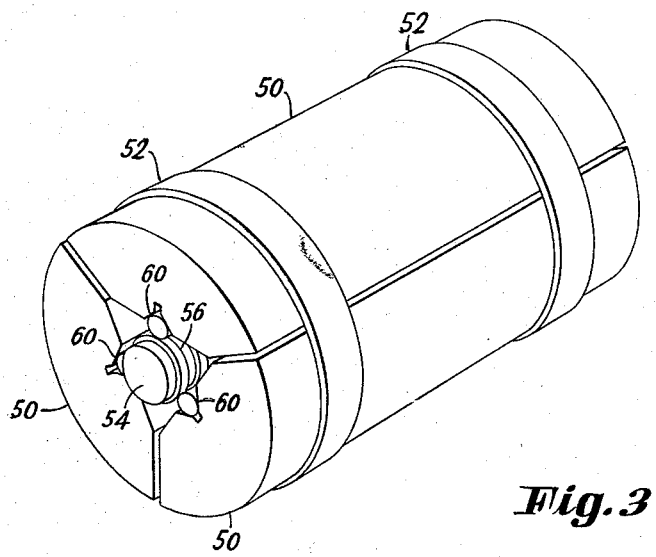
Figure 4A:
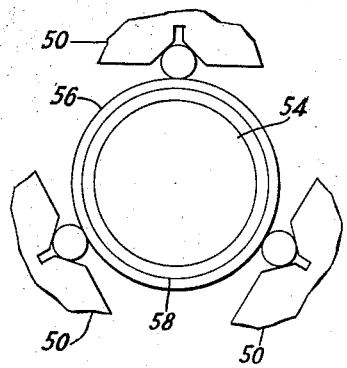
Figure 4B:
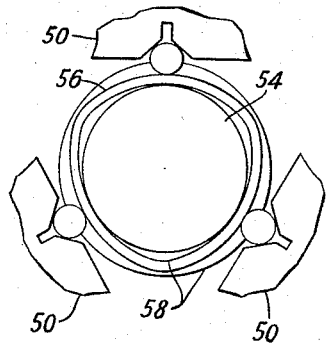

Illustrative embodiments of my invention will now be explained with reference to the accompanying drawings, wherein:

Figs. 1, 2a, 2b and 2c illustrate the use of my method when the envelope is the member to be deformed, and Figs. 3, 4a and 4b illustrate my method when the helix is the member to be deformed.

Referring now to Figs. 1 and 2, a piece of metal envelope tubing 10 is placed into a distortion jig comprising three equidistantly spaced metal members 12 in contact with the envelope and radiating outward therefrom. Members 12 are held in position by means of clamps 14. The jig distorts the tubing from a circular cross section into a pattern as shown in exaggerated form in Figs. 2a and 2b. The helix 18 is wound upon a mandrel 16 and vacuum fired in a manner well known to the art. Three spacer rods 20 are secured to the outer surface of the mandrel in conventional manner, these rods being equidistantly spaced apart and extending in a direction parallel to the axis of the helix.

The inner diameter of tubing 10 is somewhat smaller than the outer diameter of the bundle formed by the helix and the spacer rods. However, when the tubing is distorted, the helix rod bundle can be inserted into the distorted envelope as shown in Fig. 2b. The clamps 14 are then released and the envelope and helix rod bundle are removed from the jig. Since the envelope was temporarily deformed, it springs back to form an approximately cylindrical structure as shown in Fig. 2c, wherein the helix and envelope are equidistantly spaced apart circumferentially by the spacer rods 20. The mandrel and cement can subsequently be removed by conventional techniques as, for example, by chemical etching.

Referring now to Figs. 3, 4a and 4b, a helix is wound upon a mandrel in the same manner as indicated previously. The helix is then removed from the winding mandrel and installed upon one of slightly smaller diameter. Without altering the helix spacing, a thinned down thermoplastic material is flowed onto and between the helix and the mandrel, to completely fill the space between the helix and mandrel. The resulting structure is shown in Fig. 4a, wherein the mandrel is identified at 54, the thermoplastic material at 58, and the helix at 56. This assembly is then inserted into a distortion mechanism as shown in Fig. 3.

The distortion mechanism comprises three parallel metal members 50 which, when placed together, form an internal opening or channel in which the helix mandrel assembly is inserted. Each of these members 50 is also provided with a small groove parallel to the internal channel in which a support rod 60 is inserted. The metal members 50 are held together in place by clamping bands 52. The jig is then warmed or heated to a low temperature to soften the thermoplastic material and the clamping bands are then tightened to distort or deform the helix as shown in exaggerated form in Fig. 4b.

The support rods impress into the thermoplastic material longitudinal grooves of the correct size to admit and position the spacer rods used in forming the final structure. The deformed helix assembly is then removed from the distortion jig, the spacer rods are attached thereto and the entire assembly is inserted within a glass envelope in the manner shown in Fig. 2c. The assembly is then heated to soften the thermoplastic material and permit the helix to spring out against the rods and envelopes to form the desired helix-envelope structure. The operation is completed by washing out the thermoplastic material with a suitable solvent and slipping out the mandrel.

While I have shown and pointed out my invention as applied above, it will be apparent to those skilled in the art that many modifications can be made within the scope and sphere of my invention as defined in the claims which follow.

What is claimed is:

1. A method of mounting a first member within a second member, said first member being a conductor wound into a cylindrical helix, said second member being a hollow cylindrical tube envelope open at both ends, said method comprising the steps of temporarily deforming said helix radially at selected points to form regions of increased spacing between the selected points; securing a plurality of parallel spacer rods equal in number to said regions to the outer surface of said deformed helix at spaced apart locations, each rod extending in a direction parallel to the axis of said deformed helix, said rods being so oriented with respect to said regions as to permit the helix-rod assembly to be inserted into said envelope, inserting said deformed helix and rod assembly into said envelope; and restoring said deformed helix to its original shape to clamp said rods between said envelope and said helix whereby an integral helix-envelope structure is formed with uniform circumferential spacing between said helix and envelope.

2. A method of mounting a first member within a second member, said first member being a conductor wound into a cylindrical helix, said second member being a hollow cylindrical tube envelope open at both ends, said method comprising the steps of winding said helix on a first mandrel; removing said helix from said first mandrel; placing said helix on a second mandrel, the diameter of said second mandrel being slightly smaller than that of said first mandrel; flowing thermoplastic material over and between said helix and said second mandrel; heating said helix, second mandrel and said material in a distortion jig to temporarily deform said helix radially at selected points to form regions of increased spacing between the selected points; removing said deformed structure from said jig; securing a plurality of parallel spacer rods equal in number to said regions to the outer surface of said deformed structure at spaced apart locations, each rod extending in a direction parallel to the main axis of said deformed helix, said rods being so oriented with respect to said regions as to permit the helix-rod assembly to be inserted into said envelope; inserting said deformed helix and rod assembly into said envelope, said rods being aligned with the corresponding short axes of the deformed helix, said short axes extending traversely from said main axis; and heating the helix envelope structure to soften said material and thereby restore said deformed helix to its original shape to clamp said rods between said envelope and said helix whereby an integral helix-envelope structure is formed with uniform circumferential spacing between said helix and envelope.

3. The method as set forth in claim 2 further including the steps of dissolving said material to remove same from said helix envelope structure and slipping out said second mandrel from said helix envelope structure.

References Cited in the file of this patent

UNITED STATES PATENTS

| | | |
|---|---|---|
| 1,976,522 | Rose | Oct. 9, 1934 |
| 2,483,454 | Brown | Oct. 4, 1949 |
| 2,708,249 | Pryslak | May 10, 1955 |
| 2,790,926 | Morton | Apr. 30, 1957 |
| 2,806,170 | Bianculli | Sept. 10, 1957 |